(12) United States Patent
Gupta et al.

(10) Patent No.: US 10,785,029 B2
(45) Date of Patent: Sep. 22, 2020

(54) SYSTEMS AND METHODS FOR PAIRING ON-PREMISE CLUSTERS TO CLOUDS USING IDENTITY SERVICE PROVIDERS

(71) Applicant: Nutanix, Inc., San Jose, CA (US)

(72) Inventors: Vinod Gupta, San Jose, CA (US); Abhijit Khinvasara, San Jose, CA (US); Ranjan Parthasarathy, San Jose, CA (US); Pritesh Lahoti, Bangalore (IN); Akanksha Deswal, Bangalore (IN); Vaishali Gupta, Bangalore (IN); Ramesh Chandra, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 183 days.

(21) Appl. No.: 16/177,310

(22) Filed: Oct. 31, 2018

(65) Prior Publication Data
US 2020/0136825 A1    Apr. 30, 2020

(51) Int. Cl.
*H04L 9/32* (2006.01)
*H04L 29/06* (2006.01)
*H04L 29/08* (2006.01)
*G06F 9/50* (2006.01)
*G06F 9/455* (2018.01)
*H04L 12/24* (2006.01)

(52) U.S. Cl.
CPC ........ *H04L 9/3213* (2013.01); *G06F 9/45558* (2013.01); *G06F 9/5077* (2013.01); *H04L 41/12* (2013.01); *H04L 63/102* (2013.01); *H04L 63/12* (2013.01); *H04L 67/32* (2013.01); *G06F 2009/45562* (2013.01); *H04L 67/10* (2013.01)

(58) Field of Classification Search
CPC ..... H04L 9/3213; H04L 63/102; H04L 67/32; H04L 63/12; H04L 41/12; H04L 67/10; H04L 41/5003; H04L 41/0816; H04L 43/0876; G06F 9/5077; G06F 9/45558; G06F 2009/45562; G06F 9/5072
USPC ........................................................ 726/26, 4
See application file for complete search history.

(56) References Cited

U.S. PATENT DOCUMENTS

| 6,742,148 | B1 * | 5/2004 | Korhonen ............... G11C 29/56 365/201 |
| 7,234,038 | B1 * | 6/2007 | Durrant ............... G06F 12/1027 711/133 |
| 7,725,671 | B2 | 5/2010 | Prahlad et al. |
| 7,840,533 | B2 * | 11/2010 | Prahlad ............... G06F 11/1448 707/610 |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — David J Pearson
*Assistant Examiner* — Badri- Champakesan
(74) *Attorney, Agent, or Firm* — Foley & Lardner LLP

(57) ABSTRACT

A method includes receiving, by a host server on a public cloud including one or more physical data centers associated with one or more logical zones, a pairing request by a client device associated with a private cloud, allocating, by the host server, access to resources on the one or more physical data centers to the client device, and pairing, by the host server, the private cloud to the public cloud based on receiving an identity provider token from an identity provider.

23 Claims, 4 Drawing Sheets

(56) References Cited

U.S. PATENT DOCUMENTS

| | | | | |
|---|---|---|---|---|
| 8,447,728 | B2* | 5/2013 | Prahlad | G06F 21/604 |
| | | | | 707/627 |
| 8,549,518 | B1 | 10/2013 | Aron et al. | |
| 8,601,473 | B1 | 12/2013 | Aron et al. | |
| 8,762,335 | B2 | 6/2014 | Prahlad et al. | |
| 8,850,130 | B1 | 9/2014 | Aron et al. | |
| 9,203,784 | B2* | 12/2015 | Chang | H04L 49/70 |
| 9,740,723 | B2* | 8/2017 | Prahlad | G06F 9/455 |
| 9,772,866 | B1 | 9/2017 | Aron et al. | |
| 10,210,048 | B2* | 2/2019 | Sancheti | G06F 9/45558 |
| 10,248,657 | B2* | 4/2019 | Prahlad | H04L 67/1095 |
| 10,341,410 | B2* | 7/2019 | Lander | H04L 67/22 |
| 10,505,903 | B1* | 12/2019 | Pednekar | G06F 21/31 |
| 10,554,646 | B2* | 2/2020 | Hussain | G06F 9/5077 |
| 2012/0096149 | A1* | 4/2012 | Sunkara | G06F 9/5072 |
| | | | | 709/224 |
| 2015/0373012 | A1* | 12/2015 | Bartz | H04L 67/36 |
| | | | | 726/7 |
| 2016/0218939 | A1* | 7/2016 | Tiwari | H04L 12/46 |
| 2017/0006119 | A1* | 1/2017 | Pogrebinsky | G06F 8/71 |
| 2017/0099188 | A1* | 4/2017 | Chang | H04L 63/20 |
| 2017/0171157 | A1* | 6/2017 | Hristov | H04L 63/10 |
| 2017/0339070 | A1* | 11/2017 | Chang | H04L 47/829 |
| 2018/0026985 | A1* | 1/2018 | Pogrebinsky | H04L 63/0892 |
| | | | | 726/7 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jan. 8, 2019), from https://nutanixbible.com/.
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.

* cited by examiner

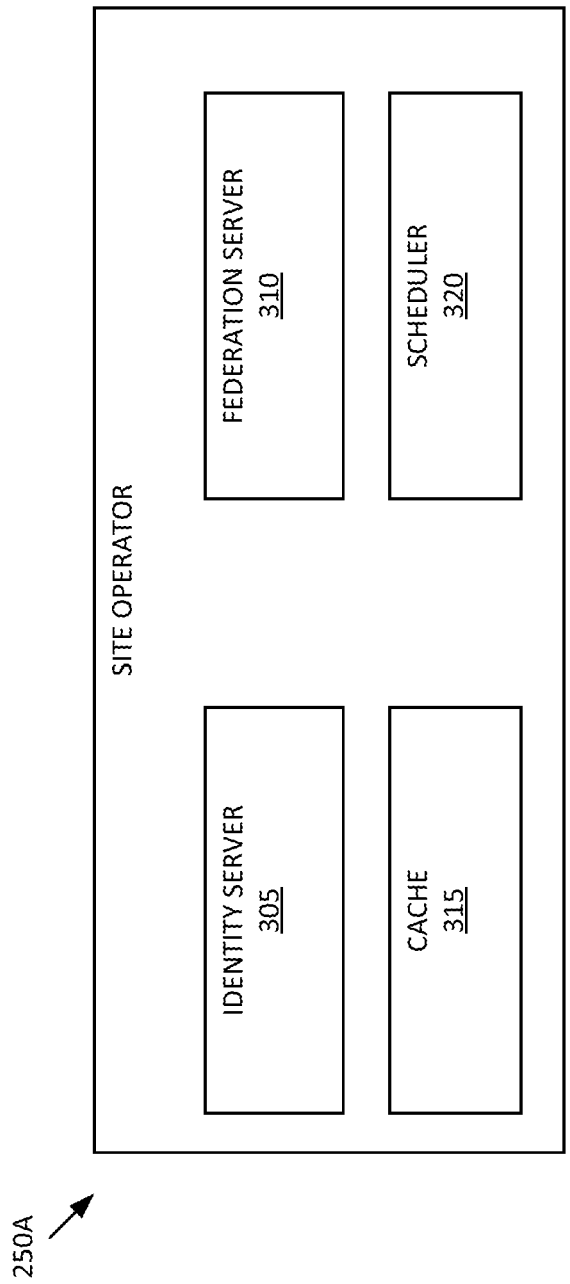

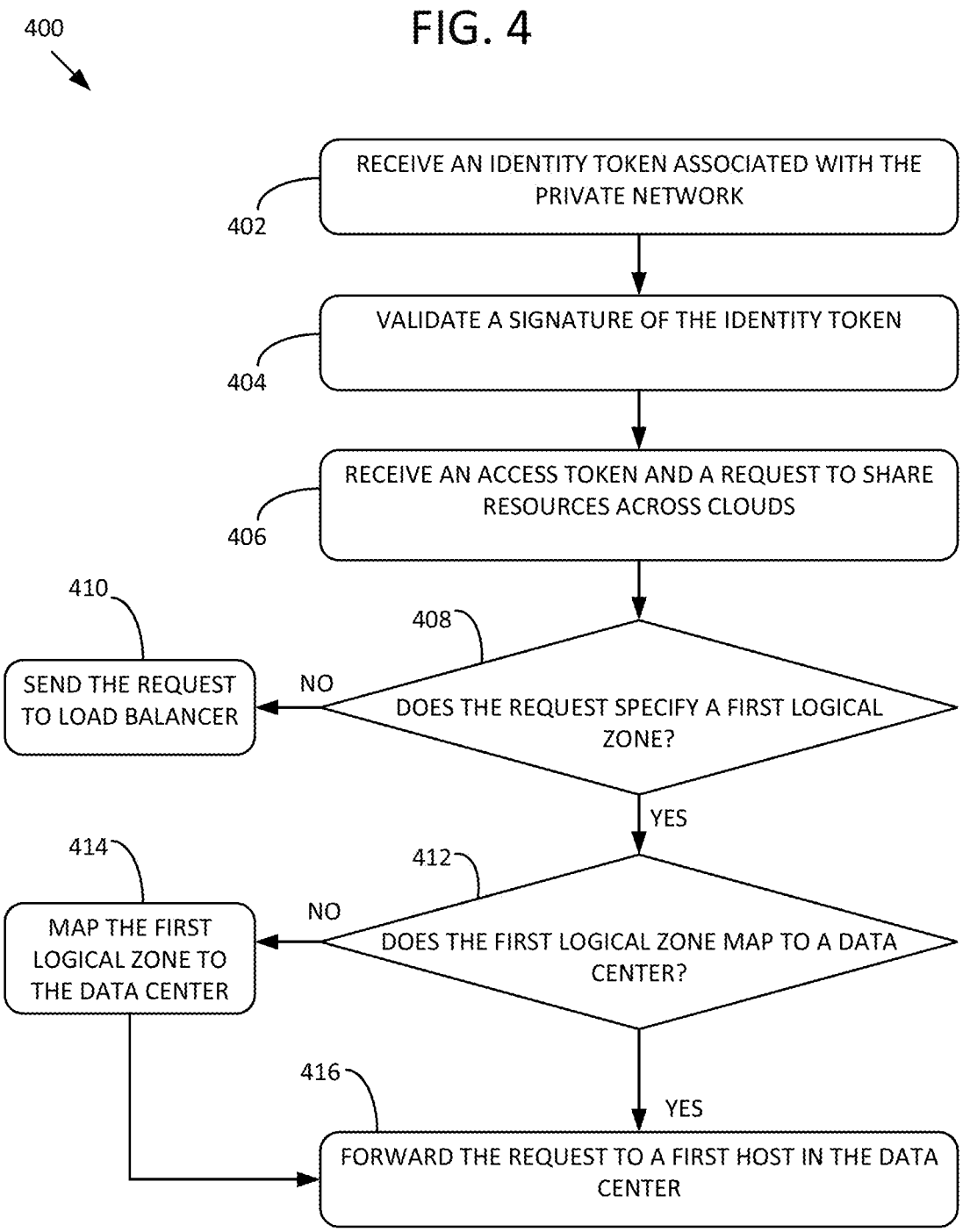

SYSTEMS AND METHODS FOR PAIRING ON-PREMISE CLUSTERS TO CLOUDS USING IDENTITY SERVICE PROVIDERS

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

Aspects of the present disclosure relate generally to a virtualization environment, and more particularly to a method for pairing on-premise clusters to clouds using identity service providers. The present disclosure includes technical solutions to address the technical problem of pairing cloud platforms without having to re-pair newly deployed availability zones. The advantages of the present disclosure include an improvement in computing unit utilization, memory utilization, and network bandwidth utilization.

An illustrative embodiment disclosed herein relates to a method including receiving, by a host server on a public cloud including one or more physical data centers associated with one or more logical zones, a pairing request by a client device associated with a private cloud, allocating, by the host server, access to resources on the one or more physical data centers to the client device, and pairing, by the host server, the private cloud to the public cloud based on receiving an identity provider token from an identity provider.

Another illustrative embodiment disclosed herein relates to a system including a private cloud. The private cloud includes a client device. The system further includes an identity provider and a public cloud. The public cloud includes one or more physical data centers associated with one or more logical zones. The one or more physical data centers includes a host server. The host server configured to receive a pairing request by the client device, allocate access to resources on the one or more physical data centers to the client device, and pair the private cloud to the public cloud based on receiving an identity provider token from the identity provider.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 is an example block diagram of a site operator, in accordance with some embodiments of the present disclosure.

FIG. 4 is an example method for pairing clouds, in accordance with some embodiments of the present disclosure.

Figure 1:
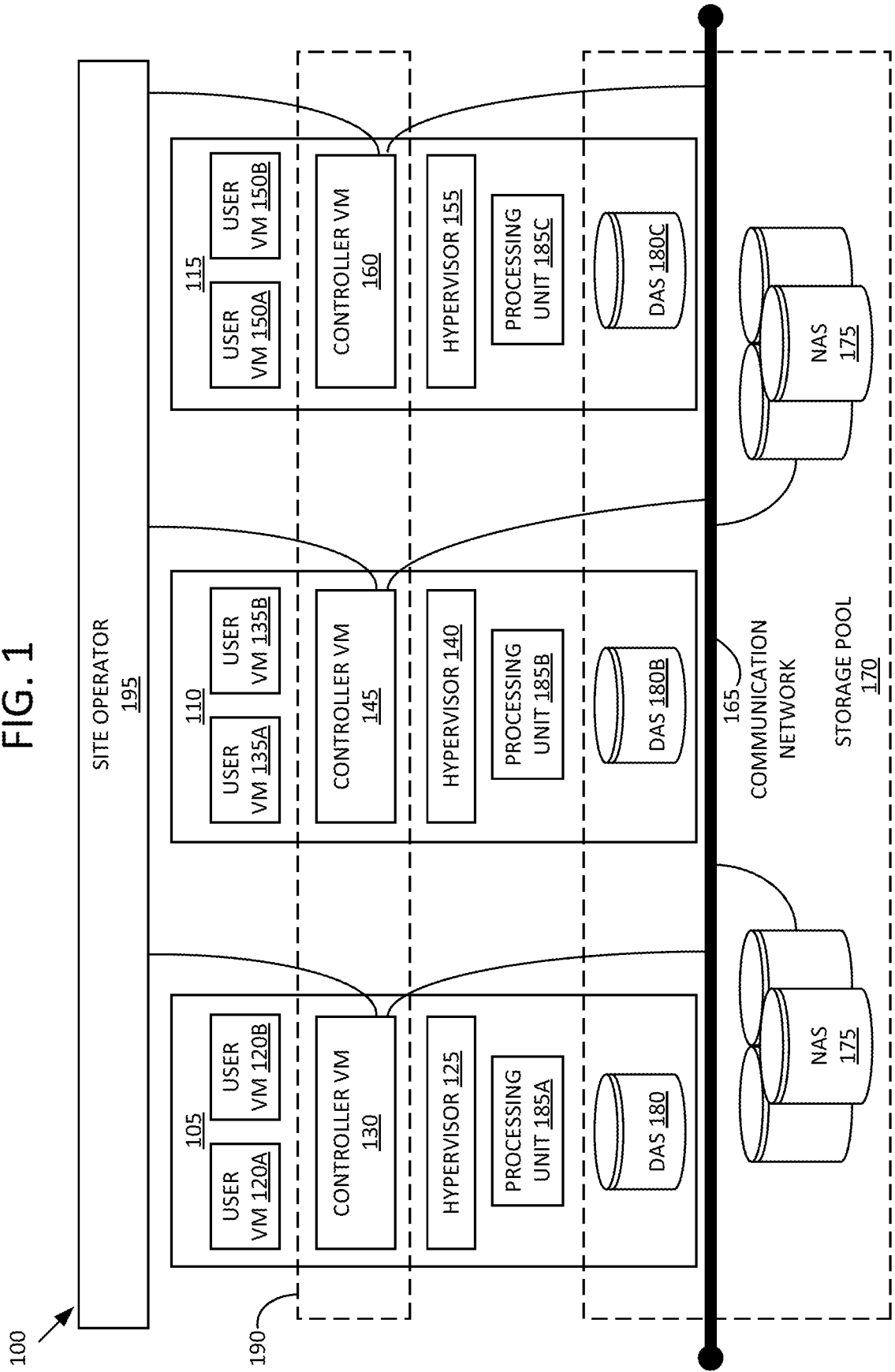
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Some enterprises deploy on-premise clusters for their own data center needs. Some enterprises subscribe to data centers deployed by third party cloud providers. However, in conventional systems, enterprises utilizing both types of services are not able to share data. A technical challenge is to pair the cloud platforms and facilitate transferring of the data and consuming of resources across the platforms. By not consuming resources across multiple platforms, administrators cannot utilize resources as optimally as in a scenario where the resources across multiple platforms are consumed. Furthermore, disaster recovery cannot be as robust if the data cannot be replicated across the multiple platforms. Another technical challenge is to enable a management plane that can access resources residing across the platforms and present metrics of the resources to an administrator. By not having a management plane for managing all the resources, admins cannot easily monitor and optimize the resource utilization across the various platforms. Another technical challenge is to pair the platforms in such a way that re-pairing is not needed when a on-premise tenant gains access to a new availability zone in the public cloud, such as a new data center in the public cloud. Having to re-pair for every availability zone may require transmitting a greater number of requests to the pairing manager. Moreover, having to re-pair for every availability zone may require expending resources to monitor the public cloud for any new availability zone that may get added. Also, having to re-pair may require manual interventional by the tenant to use the new availability zone. The increase in transmissions would be severe due to the high number of cloud pairings between various platforms, resulting in higher network congestion. Another technical challenge is to request a list of the availability zones. The contents of the list may be spread across multiple hosts, clusters, or clouds. This may result in an increase in network calls and an increase in latency in serving the requests.

The present disclosure is directed towards systems and methods for pairing on-premise clusters in a private cloud to third party clouds using identity service providers. Cloud pairing is an event of establishing trust between two tenants on two different clouds via authentication so that resources for one tenant are available to the other tenant and vice-versa, thereby achieving a symmetric view of resources on both clouds and forming a single logical entity. As a result of cloud pairing, a tenant should be able to use all availability zones on the other cloud without having to establish trust with each availability zone separately. As used herein, the availability zones may be physical data centers or logical zones. The trust between the clouds can be established by way of exchanging tokens. The tokens are generated by an identity service provider. Tokens are then saved on each system and enable authentication by the systems before data from one system is received by the other.

The present disclosure includes a technical solution to the technical challenge of pairing private, on-premise cloud platforms to public cloud platforms without having to re-pair individual availability zones. One advantage of pairing the cloud platforms is that tenants can perform virtual machine migrations, data replication, disaster recovery, and other services across the platforms. Consuming resources across the platforms can improve the computing and storage resource utilization. Transferring and replicating data in resources across the platforms can result in a more robust disaster recovery mechanism. An advantage of not having to re-pair newly deployed availability zones is that the number of pairing communications will be significantly reduced. As a result the network connecting the private and public clouds can have more available network bandwidth to process resource requests. Furthermore, resources that would otherwise utilized to monitor discovery of new availability zones can be made available for other tasks. Another advantage of not having to re-pair is that the tenant does not have to manually intervene to use the new availability zone.

The present disclosure offers a technical solution to the technical challenge of viewing the paired clouds on a single management plane. Post-cloud pairing, tenants are enabled to perform operations or consume resources spread across the cloud ecosystem through a symmetric interface. The symmetric interface includes a database that tracks all of the paired clouds. The symmetric interface includes a user interface implemented as a network application viewable by a browser on a client device or a native application downloadable by the client device. An advantage of having a single management plane with a symmetric interface is that tenants can monitor the resources across the platforms and quickly detect anomalies. Furthermore, user interfaces into cross-cloud services, such as virtual machine migrations and disaster recovery services, can be seamlessly integrated into the management plane, resulting in a more optimal data distribution and resource utilization across the clouds.

Another aspect of the present disclosure is that during the pairing process, the public cloud caches identifiers of the availability zones. In subsequent requests, a private cloud may request a list of the availability zones. An advantage of having the list of the availability zones cached in a single location is that there is a reduction in network calls and a reduction in latency in serving the requests.

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller virtual machine ("Controller VM" or "CVM") 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a CVM 145, and the third node 115 includes user VMs 150A and 150B (collectively referred to herein as "user VMs 150"), a hypervisor 155, and a CVM 160. The CVM 130, the CVM 145, and the CVM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include NAS 175 and direct-attached storage ("DAS") 180A, 180B, and 180C (collectively referred to herein as "DAS 180"). The network-attached storage ("NAS") 175 is accessible via the network 165 and, in some embodiments, may include cloud storage and/or local area network storage. In contrast to the NAS 175, which is accessible via the network 165, the DAS 180A, 180B, and 180C includes storage components that are provided internally within each of the first node 105, the second node 110, and the third node 115, respectively, such that each of the first, second, and third nodes may access its respective DAS without having to access the network 165. In some embodiments, a node can access a DAS of a different node via the network 165 (e.g. node 105 cannot access DAS 180B of node 110 via network 165).

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the CVM 130, the CVM 145, and the CVM 160, and/or the hypervisor 125, the hypervisor 140, and the hypervisor 155. One or more of the first node 105, the second node 110, and the third node 115 may be organized in a variety of network topologies.

Also, the first node 105, the second node 110, and the third node 115 may include one or more first processing units 185A, one or more first processing units 185B, and one or more first processing units 185C, respectively (collectively referred to herein as "processing units 185"). The processing units 185 may be configured to execute instructions. The instructions may be carried out by a special purpose computer, logic circuits, or hardware circuits of the first node 105, the second node 110, and the third node 115. The processing units 185 are implemented in hardware, a combination of hardware and firmware, a combination of hardware and software, or a combination of hardware, software, and firmware. The term "execution" is, for example, the process of running an application or the carrying out of the operation called for by an instruction. The instructions may be written using one or more programming language, scripting language, assembly language, etc. The processing units 185, thus, execute an instruction, meaning that they perform the operations called for by that instruction.

The processing units 185 may be operably coupled to the storage pool 170, as well as with other elements of the first node 105, the second node 110, and the third node 115 to receive, send, and process information, and to control the operations of the underlying first, second, or third node. The processing units 185 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units 185 may include a single stand-alone processing unit, or a plurality of processing units that use the same or different processing technology.

With respect to the storage pool 170 and particularly with respect to the DAS 180A, 180B, and 180C, each of the DAS may include a variety of types of memory devices. For example, in some embodiments, one or more of the DAS 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage, the local storage area network, etc.) that is suitable for use within the virtual computing system 100 and accessible via the network 165. The storage pool 170, including the NAS 175 and the DAS 180A, 180B, and 180C, together form a distributed storage system configured to be accessed by each of the first node 105, the second node 110, and the third node 115 via the network 165, the CVM 130, the CVM 145, the CVM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing units 185, memory, NAS 175, DAS 180 etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the CVM 130, the CVM 145, and the CVM 160. The CVM 130, the CVM 145, and the CVM 160 are configured to communicate with each other via the network 165 to form a distributed system 190. Each of the CVM 130, the CVM 145, and the CVM 160 may also include a local management system configured to manage various tasks and operations within the virtual computing system 100. For example, in some embodiments, the local management system in each of the CVM 130, the CVM 145, and the CVM 160 may perform various management related tasks on the user VMs 120, the user VMs 135, and the user VMs 150, respectively.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the CVM 130, the CVM 145, the CVM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the CVM (e.g., the CVM 130, the CVM 145, or the CVM 160, respectively) on the underlying node (e.g., the first node 105, the second node 110, or the third node 115, respectively). Upon receiving the input/output request, that CVM may direct the input/output request to the CVM (e.g., one of the CVM 130, the CVM 145, or the CVM 160) of the leader node. In some cases, the CVM that receives the input/output request may itself be on the leader node, in which case, the CVM does not transfer the request, but rather handles the request itself.

The CVM of the leader node may fulfil the input/output request (and/or request another component within the virtual computing system 100 to fulfil that request). Upon fulfilling the input/output request, the CVM of the leader node may send a response back to the CVM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

The virtual computing system 100 also includes a site operator 195. The site operator 195 may be configured to monitor, manage, and control various aspects of the virtual computing system 100. For example, the site operator 195 may monitor performance level of the VMs 120, 135, and 150 to determine whether one or more of the VMs 120, 135, and 150 and/or the one or more clusters are underperforming. The site operator 195 may be operatively coupled to the CVMs 130, 145, and 160 and/or the hypervisors 125, 140, and 155 for receiving such information. In some embodiments, the site operator 195 is configured to communicate with the local management systems on each of the CVMs 130, 145, and 160 for controlling the one or more clusters. In some embodiments, the virtual computing system 100 is an on-premise data center. The site operator 195 may be located within the same premise as that of the one or more clusters including the node 105, the node 110, and the node 115. In some embodiments, the site operator 195 includes a plurality of cluster operators, each cluster operator assigned to an individual cluster. In some embodiments, a cluster operator of the plurality of cluster operators is configured as a leader operator and performs the functions of the site operator 195. The site operator 195 may be one or more host servers. The site operator 195 may include one or more services that runs on a host server (e.g. node 105, 110, or 115), a user VM (e.g. the user VM 120, 135, or 150) or a CVM (e.g. the CVM 130, 145, or 160). In some embodiments, the site operator 195 can be accessed via a user interface and/or an application programming interface (API).

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2:
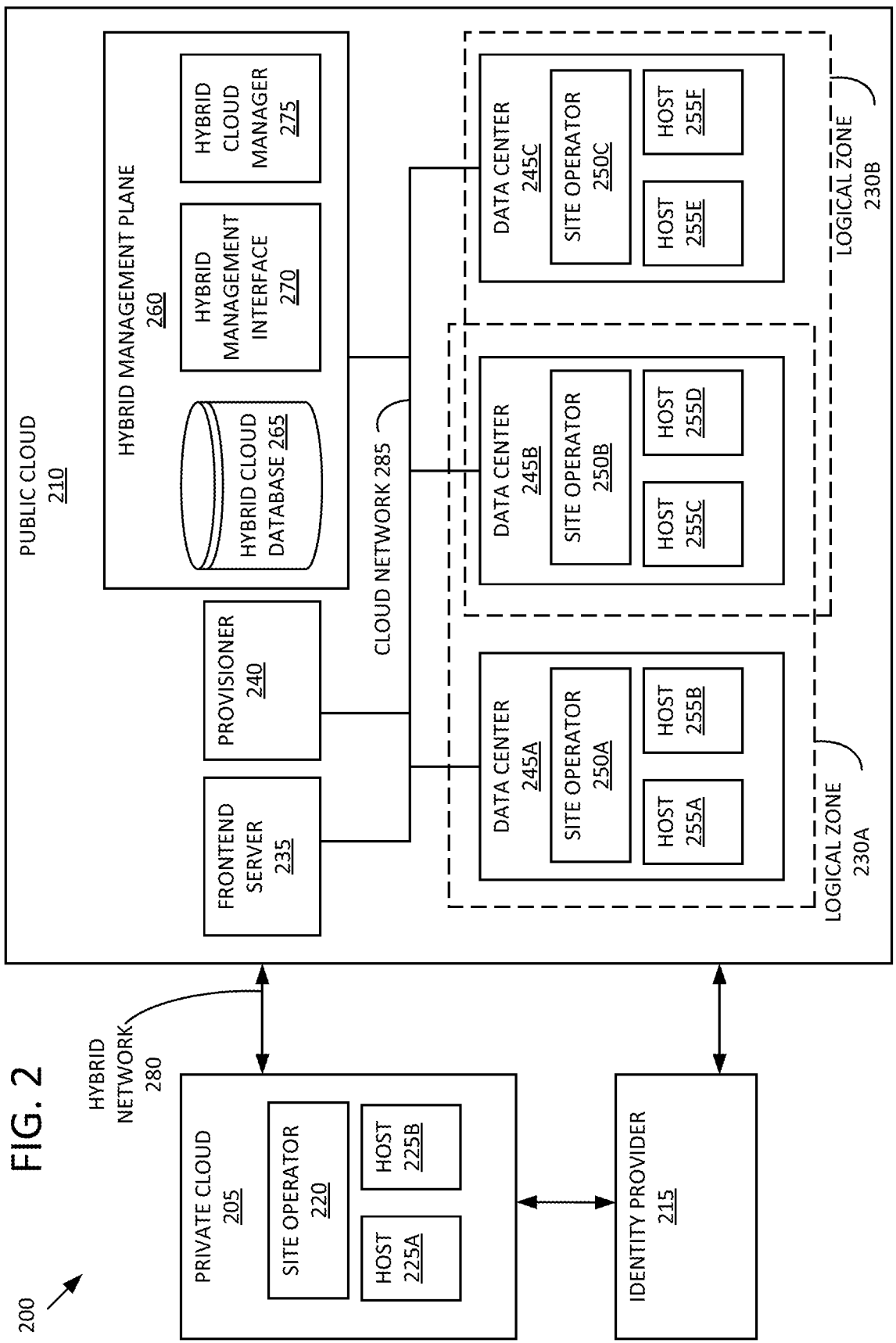
FIG. 2 is an example block diagram of a pairing environment, in accordance with some embodiments of the present disclosure.

Referring now to FIG. 2, a pairing environment 200 is shown, in accordance with some embodiments of the present disclosure. In brief overview, the pairing environment 200 may include a private cloud platform ("private cloud") 205 communicatively coupled via a hybrid network 280 to a public cloud platform ("public cloud") 210. The pairing environment 200 may include an identity provider 215 communicatively coupled to the private cloud 205 and the public cloud 210. The private cloud 205 may include a site operator 220, a host 225A, a host 225B. The public cloud 210 may include a logical zone 230A, a logical zone 230B, a frontend server 235, a provisioner 240, and a hybrid management plane 260, all of which are communicatively coupled via a cloud network 285. The logical zone 230A may include a data center 245A and a data center 245B. The logical zone 230B may include the data center 245B and the data center 245C. The data center 245A may include a site operator 250A, a host 255A, a host 255B. The data center 245B may include a site operator 250B, a host 255C, a host 255D. The data center 245C may include a site operator 250C, a host 255E, a host 255F. The hybrid management plane 260 may include a hybrid cloud database 265, a hybrid management interface 270, and a hybrid cloud manager 275.

The private cloud 205 may include a platform where the cloud resources (e.g. the hosts 225A, 225B and the resources located thereon) are exclusively owned and operated by one enterprise. The cloud resources may be physically located at the enterprise's on-site data center (e.g. an on-premises infrastructure), or can be located at a third-party service provider. The cloud resources may be physically located at multiple geographic locations. The cloud resources, services, and resources may be maintained on a private network. The public cloud 210 may include those platforms where cloud resources such as servers (e.g. the hosts 255) and storage (e.g. the storage located on the hosts 255) are operated by a third-party cloud service provider and delivered over a network, such as the Internet. With the public cloud 210, all hardware, software, and other supporting infrastructure may be owned and managed by the cloud service provider. Examples of public cloud platforms can include, without limitation, Amazon S3 (Simple Storage Service), Microsoft Azure, Google Cloud Platform, Nutanix Acropolis, Nutanix Xi, and the like. Each of the data centers 245A, 245B, and 245C (collectively referred to herein as "data centers 245") may represent a data center at one physical site.

The private cloud 205 and the data centers 245 may be instances of the virtual computing system 100 described herein with respect to FIG. 1. The site operators 220, 250A, 250B, and 250C may be instances of the site operator 195 described herein with respect to FIG. 1. The hosts 225A and 225B (collectively referred to herein as "hosts 225"), and the hosts 255A, 255B, 255C, 255D, 255E, and 255F (collectively referred to herein as "hosts 255") may be instances of a node (e.g. the node 105, the node 110, the node 115) described herein with respect to FIG. 1. Each of the hosts 225 and 255 may include instances of one or more of the user VMs 120, the controller VM 130, the hypervisor 125, the processing units 185, and the DAS 180.

Although only one site operator (e.g. the site operator 220) and two hosts (e.g. the host 225A and the host 225B) have been shown in the private cloud 205, the number of site operators may be greater than one, and the number of hosts may be greater than or fewer than two. Although only three data centers (e.g. the data centers 245), three site operator (e.g. the site operators 250) and six hosts (e.g. the hosts 255) have been shown in the public cloud 210, the number of data centers may be greater than or fewer than three, the number of site operators may be greater than or fewer than three, and the number of hosts may be greater than or fewer than six. Although only two logical zones (the logical zone 230A and the logical zone 230B, collectively referred to herein as "logical zones 230") have been shown in the public cloud 210, the number of logical zones may be greater than or fewer than two.

As described herein, a tenant is user having access to some or all of the resources of the public cloud 210. The tenant may be an employee or administrator of the enterprise owning the private cloud 205. The tenant may have access to some or all of the resources of the private cloud 205. In some embodiments, a single tenant may reserve exclusive access to one of the logical zones 230 in the public cloud 210. In some embodiments, multiple tenants can share resources of one of the logical zones in the public cloud 210.

The provisioner 240 is configured to create the public cloud 210 and onboard the tenant to the public cloud 210. The provisioner 240 may be configured to connect all of the data centers 245 so that they can communicate to each other. The provisioner 240 may be configured to map the data centers 245 to the logical zones 230. An m-to-n mapping ("global mapping") may exist from the data centers 245 to the logical zones 230. The logical zones 230 may overlap so that one or more of the data centers 245 may be mapped to multiple logical zones. For example, a logical zone (e.g. 230A) may be mapped to first data centers (e.g. 245A and 245B), and a second logical zone (e.g. 230B) may be mapped to second data centers (e.g. 245B and 245C). The provisioner may be implemented as one or more servers including one or more processing units 185. The provisioner may be implemented as one or more processing units 185 on part of another server (e.g. the frontend server 235 or the host 255).

The provisioner 240 may be configured to allocate access to resources on the one or more of the data centers 245 to the tenant via a client device associated with the tenant. The provisioner 240 may be configured to grant the tenant access to some or all of the data centers 245 ("accessible data centers") in some or all of the logical zones 230 ("accessible logical zones"). In some embodiments, the provisioner 240 exclusively grants the tenant access to one or more of the accessible data centers 245. The provisioner 240 may be configured to create a universally unique identifier ("UUID") for the tenant. The provisioner 240 may be configured to store the tenant information, such as the tenant UUID, a public cloud UUID associated with the public cloud 210, the accessible logical zones, and the accessible data centers as a data entry in a database such as the hybrid cloud database 265 or some other database. The provisioner 240 may create tenant-specific mappings ("access mappings") between the accessible logical zones and the accessible data centers. In some embodiments, the access mappings should be consistent with (e.g. not violate) the global mapping.

Referring now to FIG. 3, the site operator 250A may be configured to facilitate pairing of clouds and perform other related services. The site operator 250A may include an identity server 305, a federation server 310, a cache 315, and a scheduler 320. The site operator 250A may be configured to receive pairing requests to pair the private cloud 205 and the public cloud 210. The site operator 250A may be configured to receive resource requests to share resources. In some embodiments, the site operator 250A receives a request including the pairing request and the resource request. The site operator 250A may be able to forward the request to one or more appropriate blocks within the site operator 250A based on what kind of request the request contains. In some embodiments, the site operator 250A may receive other requests, such as a data entry request to share identifying data related to a cloud pairing, or an unpairing request to unpair the private cloud 205 and the public cloud 210.

The identity server 305 may be configured to interface with the identity provider 215. The identity server 305 may be configured to authenticate an identity of the private cloud 205. The identity server 305 may be configured to receive a pairing request. The identity server 305 may be configured to receive a request to authenticate including an identity token (e.g. identity provider, or IDP, token) from a client device on the private cloud 205 (e.g. the host 225A). The pairing request may include the request to authenticate. The client device may have previously received the token from the identity provider 215 in response to sending credentials to the identity provider 215. The identity token may include a header, a payload, and a signature. The header may include a type of the identity token and an algorithm for encoding, the payload may include relevant information and identifiers about the tenant and/or the private cloud 205, and the signature may include an encoded message of the header and/or the payload using a private key and the algorithm in the header. The identity token may include a JavaScript Object Notation ("JSON") web token ("JWT"). The identity server 305 may be configured to receive the private key from the client device or the identity provider 215. The identity server 305 may be configured to validate the signature of the identity token using the private key and the algorithm. Validating the signature of the identity token may include generating, using the private key and the algorithm, a second signature from the header and/or the payload of the identity token, comparing the second signature to the received signature, and determining that the second signature and the received signature are same. In some embodiments, the identity server 305 may receive multiple identity tokens to authenticate the client device for multiple services offered by resources of the public cloud 210 used in conjunction with resources of the private cloud 205. The services include VM provisioning services, VM monitoring and alert services, VM migration services, storage services, disaster recovery services, and the like.

Responsive to validating the signature of the identity token, the identity server 305 may be configured to generate an access token. The access token may be sent to a client device as part of any communication (e.g. request or response) from the public cloud to the client device. The access token may be similar in structure to the identity token. For example, generating the access token includes generating the signature. In some embodiments, the identity server 305 generates a first access token and the client device generates a second access token. Responsive to receiving the first access token from the public cloud, the client device may compare a first signature of the first access token to a second signature of the second access token. The client device may determine that the communication is valid responsive to the first signature matching the second signature. The second access token may be sent to the public cloud (e.g. to the identity server 305 on one of the site operators on the public cloud) as part of any communication from the client device to the public cloud. Responsive to receiving the second access token from the client device, the identity server 305 may be configured to compare the first signature of the first access token to the second signature of the second access token. The identity server 305 may be configured to determine that the communication is valid responsive to the first signature matching the second signature. In some embodiments, the identity server 305 may generate multiple access tokens for multiple services offered by resources of the public cloud 210 used in conjunction with resources of the private cloud 205.

The federation server 310 may be configured to pair some or all of the accessible data centers (the some or all of the accessible data centers are herein referred to as "paired data centers") in some or all of the accessible logical zones (the some or all of the accessible logical zones are herein referred to as "paired logical zones") to the private cloud 205. In some embodiments, the federation server 310 pairs the paired data centers and the paired logical zones responsive to authentication, by the identity server 305, of the private cloud. In some embodiments, the federation server 310 pairs the paired logical zones to the private cloud 205 responsive to a first trigger and pairs the paired data centers to the private cloud 205 responsive to a second trigger occurring later in time than the first trigger. The federation server 310 may be configured to generate mappings ("paired mappings") between the paired data centers and the paired logical zones. In some embodiments, the paired mappings should be consistent with the access mapping and the global mapping. In some embodiments, the paired mappings are a subset of the accessible mappings. The federation server 310 may be configured to determine the paired data centers and the paired logical zones based on a policy or a service level agreement (SLA). In some embodiments, each of the paired data centers is mapped to, at most, one of the paired logical zones.

In some embodiments, the federation server 310 may receive a request to add a new logical zone (e.g. an instance of logical zone 230A), a new data center (e.g. an instance of data center 245A), or both, to the paired mappings. The federation server 310 may determine how the new logical zone and/or the new data center is mapped. The federation server 310 may access the global mappings or the accessible mappings to make the determination. The federation server 310 may receive mapping information within the request to add the new logical zone and/or the new data center. The federation server 310 may update the paired mappings to include the new logical zone and/or the new data center. The private cloud 205 that has already paired with the public cloud 210 may not need to re-pair to the new logical zone and/or the new data center.

The federation server 310 may be configured to generate a data entry used for subsequent requests by the private cloud 205 or the public cloud 210 for sharing of resources. The subsequent requests for sharing of resources may be referred to as the resource requests. In some embodiments, the federation server 310 generates the data entry responsive to authentication, by the identity server 305, of the private cloud or responsive to generating, by the federation server 310, the paired mappings. The data entry may include the tenant UUID, a private cloud 205 UUID, a public cloud 210 UUID, a list of the paired logical zones, a list of the paired data centers, a mapping of the public cloud 210 to the list of the paired logical zones, the paired mappings, the first access token, and/or the second access token. In some embodiments, for every UUID (e.g. the private cloud 205 UUID), the data entry may include a second identifier. The UUID may include a machine-readable identifier string, and the second identifier may include a human-readable identifier string. The data entry may be stored in the hybrid cloud database 265.

The federation server 310 may be configured to receive a request from the client device. In some embodiments, the request includes the pairing request. In some embodiments, the request includes the resource request. In some embodiments, the request is a request to login to the public cloud 210 from the private cloud 205. The request may include a remote application programming interface (API) call. The request may include the second access token. The federation server 310 may be configured to forward the second access token to the identity server 305 to validate authenticity of the request by matching signatures of the first access token and the second access token. In some embodiments, the federation server 310 may be configured to validate the authenticity by matching the signatures. The federation server 310 may be configured to generate the data entry responsive to the received request and/or responsive to validating the authenticity.

In some embodiments, the resource request includes a request to access resources in a logical zone (e.g. the logical zone 230A). The federation server 310 may be configured to determine whether the requested logical zone is paired with the private cloud 205. The federation server 310 may search, in the hybrid cloud database 265, the data entry having the tenant UUID or the private cloud 205 UUID associated with the client device sending the resource request. Responsive to not finding the requested logical zone in the data entry having the tenant UUID or the private cloud 205 UUID, the federation server 310 may send a response including a notification that the requested logical zone is not paired. Responsive to finding the requested logical zone in the data entry having the tenant UUID or the private cloud 205 UUID associated with the client device sending the resource request, the federation server 310 may be configured to determine whether the requested logical zone is mapped to one or more of the accessible data centers within the requested logical zone (the one or more of the accessible data centers within the requested logical zone is herein referred to as "one or more first paired data centers"). Responsive to determining that the requested logical zone is not mapped to the one or more first paired data centers, the federation server 310 may be configured to map the requested logical zone to the one or more first paired data centers. Responsive to mapping the requested logical zone to the one or more first paired data centers or responsive to determining that the requested logical zone is mapped to the one or more first paired data centers, the federation server 310 may be configured to forward the resource request to the one of the one or more first paired data centers. In some embodiments, the federation server 310 may be configured to forward the resource request to a load balancer (e.g. a reverse proxy) in the frontend server 235. In some embodiments, the resource request does not include a request for the logical zone. Responsive to the resource request not including the logical zone, the federation server 310 may be configured to forward the request resource to the load balancer in the frontend server 235.

In some embodiments, the request from the client device (or a local request from one of the hosts 255) includes a GET/LIST API request for data, such as the list of the paired logical zones, in the data entry (herein referred to as a "data entry request"). The federation server 310 may process the request by searching for and returning the requested data in the hybrid cloud database 265. In some, embodiments, the GET/LIST API includes the tenant UUID or the private cloud 205 UUID. The federation server 310 may find the requested data in a data entry having the tenant UUID or the private cloud 205 UUID. Some or all of the data entry may be visible to or accessible by the client device. In some embodiments, the client device may receive or request to receive the private cloud 205 UUID, the public cloud 210 UUID, the paired logical zones, and the mapping of the public cloud 210 UUID to the paired logical zones, but the client device may not receive or request to receive the paired data centers or the paired mappings.

The federation server 310 may be configured to unpair the paired data centers and the paired logical zones from the private cloud 205 (herein referred to as an "unpairing request"). The federation server 310 may be configured to receive the unpairing request from the client device to unpair the paired data centers and the paired logical zones from the private cloud 205. The federation server 310 may be configured to search for a data entry including the private cloud 205 UUID associated with the client device in the hybrid cloud database 265. Responsive to finding the data entry including the private cloud 205 UUID associated with the client device, the federation server 310 may be configured to serve the unpairing request by deleting the data entry.

The site operator 250A may include a cache 315. The cache 315 may store instances of the data entries stored in the hybrid cloud database 265. The data entry request by one of the hosts 255 for data in a first data entry may be served by the cache 315. Responsive to the cache 315 not serving the data entry request because of a cache miss (e.g. the cache 315 does not have the requested data), the data entry request may be served by the hybrid cloud database 265. The cache 315 may have limited capacity for the data entries and may utilize an eviction algorithm based on least recently used (LRU), least frequently used (LFU), clustering, or a combination thereof.

The site operator 250A may include a scheduler 320. The scheduler 320 may refresh the cache 315 periodically. For example, the scheduler 320 may refresh the cache 315 on a per minute basis. In some embodiments, the scheduler 320 may determine that an underlying state as changed (e.g. via periodically querying the underlying memory or via receiving an alert from the underlying memory). Responsive to the scheduler 320 determining that the underlying state has changed, the scheduler 320 may refresh the cache 315. In some embodiments, responsive to a cache miss occurring for the cache 315, the scheduler 320 refreshes the cache 315.

Although the components in the site operator 250A (e.g. the identity server 305, the federation server 310, the cache 315, and the scheduler 320) are described only with respect to site operator 250A, the description of the components and features of the site operator 250A may apply to all of the site operators 250 and the site operator 220. In some embodiments, the one or more of the components in the hosts 255 (instances of the user VMs 120, the controller VM 130, the hypervisor 125, the processing units 185, and the DAS 180) includes the identity server 305, the federation server 310, the cache 315, and the scheduler 320. The pairing request, the resource request, the data entry request, and/or the unpairing request may be served by the one or more of the components in the hosts 255.

In some embodiments, the private cloud 205 hosts 225 or one or more of the components in the hosts 225 (instances of the user VMs 120, the controller VM 130, the hypervisor 125, the processing units 185, and the DAS 180) includes the identity server 305, the federation server 310, the cache 315, and the scheduler 320 in the site operator 250A. The pairing request, the resource request, the data entry request, and/or the unpairing request may be served by the hosts 225 or the one or more of the components in the hosts 225.

Referring now back to FIG. 2, the public cloud may include the frontend server 235. The frontend server 235 may include one or more web servers that forward requests (e.g. pairing, resource, data entry, and/or unpairing requests) from the client device to the hosts 255. The frontend server may include a proxy server. The proxy server may be configured to act as an intermediary for requests from the client device seeking resources from the public cloud 210. The proxy server may include a reverse proxy (e.g. NGINX proxy). The reverse proxy may be configured to decrypt Secure Sockets Layer (SSL) encrypted requests from the client device. The reverse proxy may be configured to reject the request of the client device responsive to determining that the client device has a first IP address. The reverse proxy may be configured to distribute a workload in a way that optimally uses the resource capacity of the hosts 255. For example, the reverse proxy is configured to determine a first host (e.g. the host 255A) having a lowest resource utilization among the hosts 255A and forward the request to the first host.

The hybrid management plane 260 may include a hybrid cloud database 265 and a hybrid management interface 270 and a hybrid cloud manager 275. The hybrid management plane 260 may include services for managing a hybrid cloud environment, such as storage services, user interface services, and services provided by the site operator 250A. The hybrid management plane 260 may include one or more servers. The hybrid cloud database 265 may include the data entries for pairing public clouds to private clouds (e.g. the public cloud 210 to the private cloud 205). Each of the data entries may include all information associated with the paired clouds including a tenant UUID, a private cloud 205 UUID, a public cloud 210 UUID, a list of the paired logical zones, a list of the paired data centers, a mapping of the public cloud 210 to the list of the paired logical zones, paired mappings, and/or one or both access tokens.

The hybrid management plane 260 may include a hybrid management interface 270. The hybrid management interface 270 may include a network application that can be viewed by a web browser of the client device. The hybrid management interface 270 may include a native application that can be downloaded by the client device. The hybrid management interface 270 may display or enable displaying of metrics, such as consumption metrics, of the resources provided across the paired clouds. For example, the metrics include central processing unit (CPU) utilization of the processing units 185, CPU ready time, memory utilization, input/output (I/O) utilization, I/O latency, and I/O operations per second (TOPS). The metrics can be displayed on a user VM basis, a CVM basis, a host basis, a cluster basis, or a datacenter basis. The metrics may be computed by the hybrid cloud manager 275. The hybrid management interface 270 may display objects that, when selected by a mouse, keyboard, touchscreen, and the like, may send a request to the hybrid cloud manager 275 or may change the metrics that are displayed or the entities for which the metrics are displayed by the hybrid management interface 270.

The hybrid management plane 260 may include the hybrid cloud manager 275. The hybrid cloud manager 275 may be configured to determine the metrics of the resources provided across the paired clouds to be displayed by the hybrid management interface 270. In some embodiments, the hybrid cloud manager is configured to pair clouds, unpair clouds, serve or forward resource requests, or refresh data entries in cache that are instances of the data entries in the hybrid cloud database 265. In some embodiments, the hybrid cloud manager 275 includes some or all of the components and features of the site operator 250A.

In response to pairing the private cloud 205 and the public cloud 210, the client device may use the resources shared across the private cloud 205 and the public cloud 210 to perform many cross-cloud services. The client device may request the services as part of the resource request. The services include VM provisioning services, VM monitoring and alert services, VM migration services, storage services, disaster recovery services, and the like. For example, the client device may send a first request to a host to create a container from one or more of the storage resources in the public cloud 210. The client device may send a second request to copy an object from one or more storage resources in the private cloud 205 to the container. The object being copied may include a user VM, an image of a user VM, a volume, a disk, a virtual disk, or a snapshot.

Each of the elements or entities of the virtual computing system 100, the pairing environment 200, and the site operator 250A is implemented in hardware, or a combination of hardware and software, in one or more embodiments. Each component of the virtual computing system 100, the pairing environment 200, and the site operator 250A may be implemented using hardware or a combination of hardware or software detailed above in connection with FIG. 1. For instance, each of these elements or entities can include any application, program, library, script, task, service, process or any type and form of executable instructions executing on hardware of a node (e.g. the node 105). The hardware includes circuitry such as one or more processing units (e.g. the processing unit 185A) in one or more embodiments.

Referring now to FIG. 4, a method 400 for pairing clouds is shown. The method 400 for pairing clouds may be implemented using, or performed by, the components of the pairing environment 200 detailed herein with respect to FIG. 2. Additional, fewer, or different operations may be performed in the method 400 depending on the embodiment. In brief overview of the method 400, the host server receives an identity token associated with the private network (402). The host server then validates a signature of the identity token (404). The host server receives an access token and a request to share resources across clouds (406). The host server determines whether the request specifies a first logical zone (408). In response to determining that the request does not specify the first logical zone, the host server sends the request to a load balancer (410). In response to determining that the request specifies the first logical zone, the host server determines whether the first logical zone maps to a data center (412). In response to determining that the first logical zone does not map to a data center, the host server maps the first logical zone to the data center (414). In response to determining that the first logical zone maps to the data center, or in response to mapping the first logical zone to the data center, the host server forwards the request to a first host in the data center (416).

At operation 402, a host server, such as the site operator 250A, receives an identity token associated with the private network. The host server may receive a private key associated with the identity token. The identity token may include a payload, a signature, and a header including an algorithm. In some embodiments, the host server may receive multiple identity tokens to authenticate the client device for multiple services, wherein each of the multiple identity tokens is authenticated for a different service of the multiple services.

At operation 404, the host server validates the signature of the identity token. Validating the signature of the identity token may include generating a second signature. The second signature may be generated by hashing the header and/or payload with the private key in accordance with the algorithm specified in the header. Generating the second signature may include one or more further encoding steps in accordance with the algorithm. Validating the signature may include comparing the second signature to the received signature, and determining that the second signature and the received signature are same. In response to validating the signature of the identity token, the host server may generate a data entry used for subsequent requests by a private cloud, such as the private cloud 205, or the public cloud, such as the public cloud 210 for sharing resources. The data entry may be stored in a database, such as the hybrid cloud database 265.

At operation 406, the host server generates an access token and a request to share resources across clouds (e.g. receives the resource request). The access token may be similar in structure to the identity token except for having different content in the header and/or the payload. Generating the access token may be in response to validating the signature of the identity token. The access token may be stored as part of the data entry in the database. The request may include a request to create a user VM (such as the user VM 120), migrate the user VM, replicate the user VM or storage data (such as some or all of DAS 180), recover the user VM the storage data, de-duplicate the storage data, or the like.

At operation 408, the host server determines whether the request specifies a first logical zone. The host server may receive a tenant UUID or a private cloud UUID. The host server may search for a first logical zone in a data entry corresponding to the tenant UUID or the private cloud UUID. The data entry may be located in the database.

In response to determining that the request does not specify the first logical zone, at operation 410, the host server sends the request to a load balancer. The load balancer may be located in a frontend server, such as the frontend server 235. The load balancer may distribute a workload including the request in a way that optimally uses the resource capacity of hosts, such as the hosts 255. The load balancer may send the request to a first host having the lowest resource utilization among the hosts.

In response to determining that the request specifies the first logical zone, at operation 412, the host server determines whether the first logical zone maps to a data center. The host server may look up the data center in the data entry corresponding to the first logical zone. The host server may send a command to the database including the data entry requesting to return any of the data centers mapped to the first logical zone.

In response to determining that the first logical zone does not map to a data center, at operation 414, the host server maps the first logical zone to the data center. Mapping occurs by modifying the data entry corresponding to the first logical zone to include the data center. In response to determining that the first logical zone maps to the data center, or in response to mapping the first logical zone to the data center, at operation 416, the host server may forward the request to a first host in the data center. In some embodiments, the host server may forward the request to the load balancer to determine which host is best suited for servicing the request.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
receiving, at a server on a public cloud comprising a first data center in the public cloud, a pairing request by a client device associated with a private cloud;
responsive to determining that a first logical zone is not mapped to the first data center, mapping the first data center to the first logical zone;
allocating access to resources on the first data center to the client device;
pairing the private cloud to the first logical zone of the public cloud based on receiving an identity token from an identity provider;
receiving a second pairing request from the client device to pair with a second data center in a second logical zone, wherein the first logical zone and the second logical zone are different; and
pairing the private cloud to the second logical zone without re-pairing the first logical zone to the private cloud.

2. The method of claim 1, further comprising:
validating a signature of the identity token; and
generating an access token based on validating the signature of the identity token.

3. The method of claim 1, further comprises mapping each of a plurality of data centers to, at most, one of the plurality of logical zones.

4. The method of claim 1, further comprising forwarding a resource request to a first server associated with the one of the plurality of physical data centers.

5. The method of claim 1, further comprises:
receiving a container request to create a container from a plurality of first resources of the public cloud; and
receiving a second request to copy an object from a plurality of second resources of the private cloud to the container, wherein the object is one of a user virtual machine, an image, a volume, a disk, a snapshot.

6. The method of claim 1, wherein allocating the access to the resources on the first data center to the client device comprises allocating the access to the resources on the first data center of a plurality of physical data centers exclusively to the private cloud associated with the client device.

7. The method of claim 1, wherein the identity token includes a plurality of identity tokens for each service offered by the public cloud.

8. The method of claim 1, wherein the pairing request includes one of a request to login to the public cloud or a remote application programming interface (API) call to the public cloud.

9. A system comprising:
a private cloud comprising a client device;
an identity provider; and
a public cloud comprising a first data center in the public cloud, the first data center comprising a server having programmed instructions to:
receive a pairing request by the client device;
responsive to determining that a first logical zone is not mapped to the first data center, map the first data center to the first logical zone;
allocate access to resources on the first data center to the client device;
pair the private cloud to the first logical zone of the public cloud based on receiving an identity token from the identity provider;
receive a second pairing request from the client device to pair with a second data center in a second logical zone, wherein the first logical zone and the second logical zone are different; and
pair the private cloud to the second logical zone without re-pairing the first logical zone to the private cloud.

10. The system of claim 9, wherein the server further includes programmed instructions to:
validate a signature of the identity token; and
generate an access token based on validating the signature of the identity token.

11. The system of claim 9, wherein the server further includes programmed instructions to map the first data center to the first logical zone such that each of a plurality of data centers is mapped to, at most, one of a plurality of logical zones.

12. The system of claim 9, wherein the server further includes programmed instructions to forward a resource request to a first server associated with the one of a plurality of data centers.

13. The system of claim 9, wherein the server further includes programmed instructions to:
receive a container request to create a container from a plurality of first resources of the public cloud; and
receive a second request to copy an object from a plurality of second resources of the private cloud to the container, wherein the object is one of a user virtual machine, an image, a volume, a disk, a snapshot.

14. The system of claim 9, wherein the server further includes programmed instructions to allocate the access to the resources on a first physical data center of a plurality of data centers exclusively to the private cloud associated with the client device.

15. The system of claim 9, wherein the identity token includes a plurality of identity tokens for each service offered by the public cloud.

16. The system of claim 9, wherein the pairing request includes one of a request to login to the public cloud or a remote application programming interface (API) call to the public cloud.

17. The method of claim 2, further comprising:
generating, by the server, a data entry including the access token, an identifier of the public cloud, and a plurality of identifiers of a plurality of logical zones; and
sharing, by the server, contents of the data entry with the client device.

18. The system of claim 10, further comprising:
generating a data entry including the access token, an identifier of the public cloud, and a plurality of identifiers of the plurality of logical zones; and
sharing contents of the data entry with the client device.

19. A non-transitory computer-readable media comprising computer-executable instructions embodied thereon that, when executed by a processor, cause the processor to perform a process comprising:
receiving, at a server on a public cloud comprising a first data center in the public cloud, a pairing request by a client device associated with a private cloud;
responsive to determining that a first logical zone is not mapped to the first data center, mapping the first data center to the first logical zone;
allocating access to resources on the first data center to the client device;

pairing the private cloud to the first logical zone of the public cloud based on receiving an identity token from an identity provider;

receiving a second pairing request from the client device to pair with a second data center in a second logical zone, wherein the first logical zone and the second logical zone are different; and pairing the private cloud to the second logical zone without re-pairing the first logical zone to the private cloud.

20. The non-transitory computer-readable media of claim 19, wherein the pairing operation includes disaster recovery from the public cloud to the private cloud.

21. The non-transitory computer-readable media of claim 19, wherein the process further comprises:

forwarding, by the server, a resource request to a first server associated with the one of the plurality of data centers.

22. The non-transitory computer-readable media of claim 19, further comprises:

receiving a first request to create a container from a plurality of first resources of the public cloud; and receiving a second request to copy an object from a plurality of second resources of the private cloud to the container, wherein the object is one of a user virtual machine, an image, a volume, a disk, a snapshot.

23. The method of claim 1, wherein the pairing operation includes disaster recovery from the public cloud to the private cloud.

* * * * *